Feb. 16, 1965   J. L. ROOF   3,170,109
DYNAMOELECTRIC MACHINE EXCITATION CONTROL
BY USE OF PULSE WIDTH MODULATION
Filed Jan. 18, 1960   2 Sheets-Sheet 1

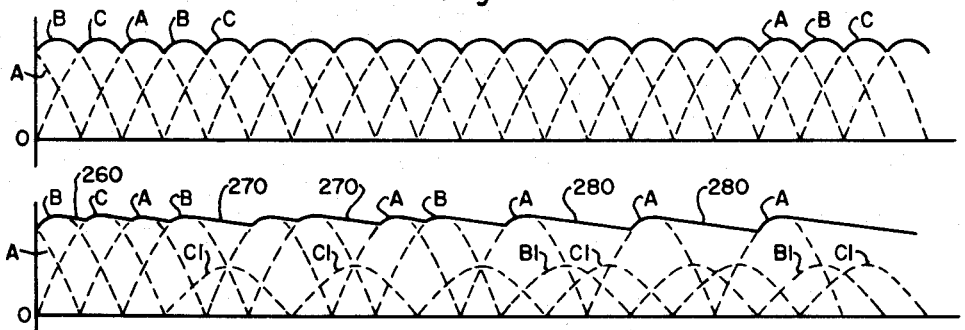
Fig. 2
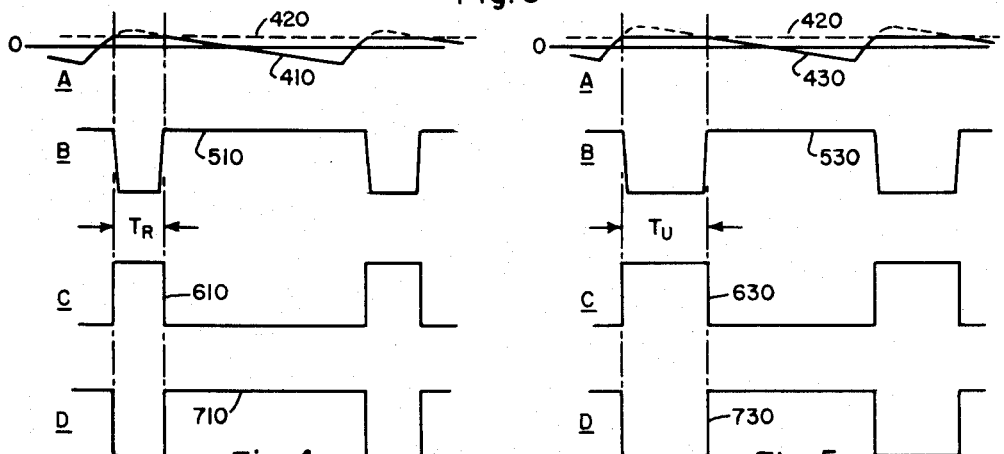
Fig. 3
Fig. 4    Fig. 5
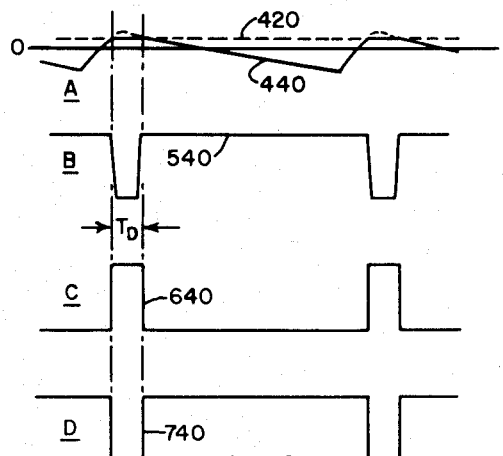
Fig. 6

United States Patent Office 3,170,109
Patented Feb. 16, 1965

3,170,109
DYNAMOELECTRIC MACHINE EXCITATION CONTROL BY USE OF PULSE WIDTH MODULATION
James L. Roof, Lima, Ohio, assignor to Westinghouse Electric Corporation, East Pittsburgh, Pa., a corporation of Pennsylvania
Filed Jan. 18, 1960, Ser. No. 3,041
5 Claims. (Cl. 322—28)

This invention relates to electrical control apparatus, and more particularly, to regulator systems.

Many conventional types of electrical control apparatus, such as regulator systems, are employed to control the excitation current applied to the field winding of a dynamoelectric machine, such as an alternator. An improved electrical control apparatus of the type described is disclosed in U.S. Patent No. 2,896,149, which issued July 21, 1959, on an application of L. R. Lowry, Jr., et al. and which is assigned to the same assignee as the present application. In the latter control apparatus, the excitation current is supplied to a dynamoelectric machine in the form of periodic output pulses whose width varies in accordance with a unidirectional or direct-current control signal. The control apparatus disclosed in the latter patent employs a sawtooth voltage generator or relaxation oscillator in combination with an error detecting circuit or other source of a unidirectional or direct-current control signal to control the operation of one or more static switching devices, such as transistors, to produce the periodic output pulses which are applied as excitation current to the field winding of the associated dynamoelectric machine. The control apparatus just described possesses a number of advantages over conventional electrical control apparatus, such as regulator systems, of the static type which employ magnetic amplifiers, particularly in aircraft applications. It is, therefore, desirable to provide an improved electrical control apparatus of the type described which has all of the advantages of the control apparatus disclosed in the above patent and which has the additional advantage of not requiring a separate sawtooth voltage generator or relaxation oscillator, as well as several other advantages.

It is an object of this invention to provide a new and improved electrical control apparatus.

Another object of this invention is to provide a new and improved regulator system for a dynamoelectric machine, such as an alternator.

A further object of this invention is to provide a new and improved electrical control apparatus for obtaining periodic output pulses whose width varies with an alternating current control signal.

A still further object of this invention is to provide a regulator system for a polyphase dynamoelectric machine which is effectively responsive to the highest phase voltage of said machine.

A more specific object of this invention is to provide a new and improved control apparatus for controlling the excitation current applied to the field winding of the dynamoelectric machine by the use of pulse width modulation.

Other objects of the invention will, in part, be obvious and will, in part, appear hereinafter.

For a fuller understanding of the nature and objects of this invention, reference should be had to the following detailed description taken in connection with the accompanying drawings, in which:

FIGS. 2 and 3 are waveforms or graphical representations illustrating the operation of portions of the control apparatus shown in FIG. 1 during certain operating conditions; and FIGS. 4, 5 and 6 are sets of graphs illustrating the operation of the control apparatus shown in FIG. 1 for various magnitudes of the output voltage of the dynamoelectric machine shown in FIG. 1.

Figure 1:
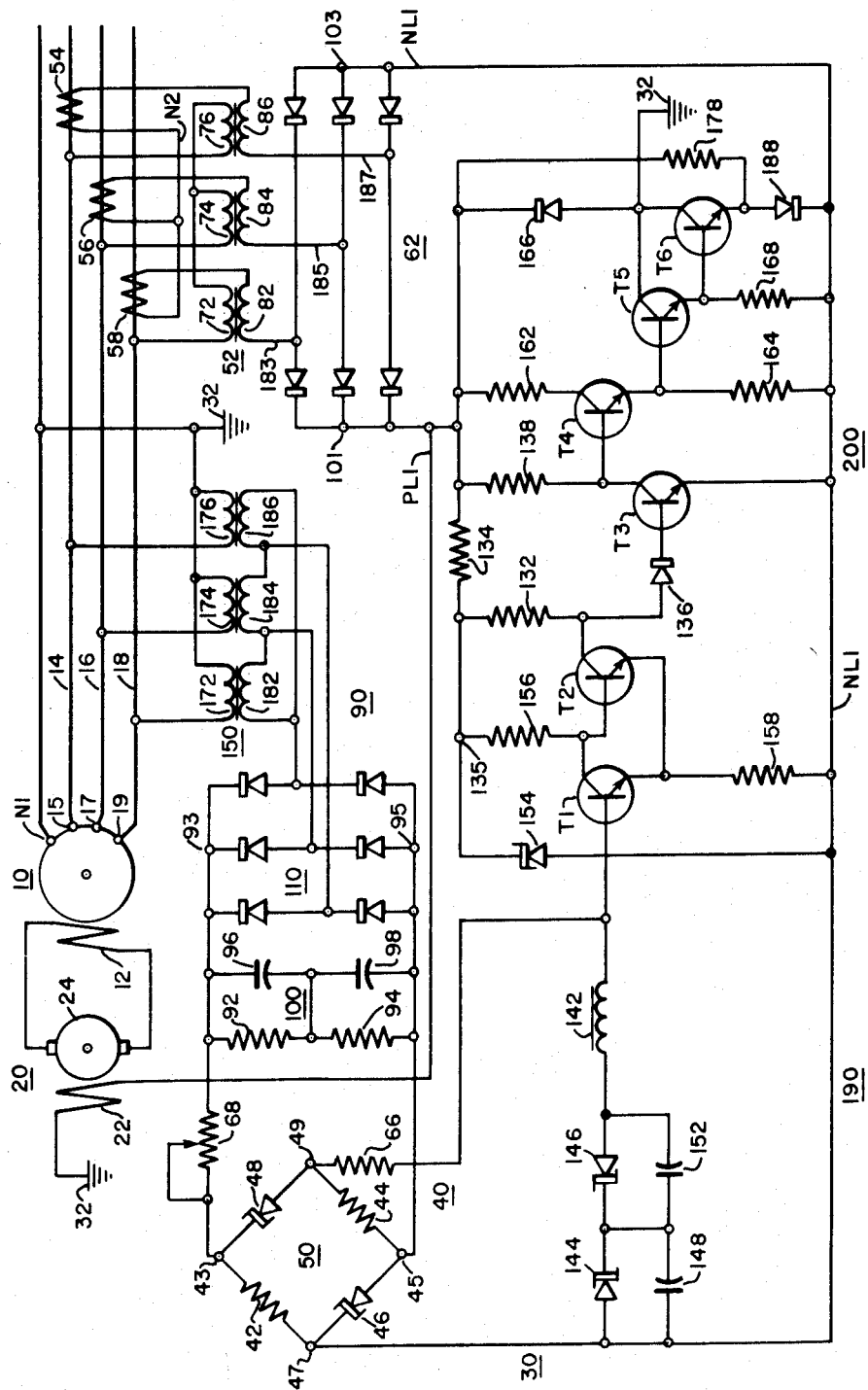
FIGURE 1 is a schematic diagram of circuits and apparatus illustrating one embodiment of this invention.

Referring now to the drawings, and FIG. 1 in particular, there is illustrated a dynamoelectric machine, more specifically a synchronous generator or alternator 10 having an excitation field winding 12 and the output terminals 15, 17 and 19, as well as a neutral terminal N1 since the stator windings (not shown) of the generator 10 are normally connected in a Y arrangement. In this instance, the generator 10 is disposed to supply electric power to a load (not shown) through the output terminals 15, 17 and 19 to the line conductors 14, 16 and 18, respectively, which are part of a three-phase electrical system. In order to obtain an excitation voltage across the field winding 12 of the generator 10 of relatively large magnitude, an exciter 20 is provided. In this instance, the exciter 20 comprises an armature 24 which supplies excitation current to the field winding 12 of the generator 10 and a separate excitation field winding 22 having one end connected to a common ground connection, as indicated at 32. In order to maintain the output voltage of the generator 10 at substantially a predetermined value, a regulator system 30 is connected between the output terminals 15, 17 and 19 of the generator 10 and the excitation field winding 22 of the exciter 20.

In general, the regulator system or loop 30 comprises a first circuit or rectifying means 90 for obtaining a unidirectional output voltage which includes a ripple component and which varies with the alternating current output voltage of the generator 10, second circuit or voltage shaping means 100 for modifying or converting the harmonic component of the unidirectional output voltage of the first means 90 to be substantially triangular in shape, a third circuit means or error detecting circuit 40 for comparing the unidirectional output voltage from the first circuit means 90, as modified by the second circuit means 100, with substantially a predetermined voltage or reference voltage to obtain an error signal or difference voltage which is substantially triangular in shape, a switching means or device, more specifically the switching transistor T1, which is responsive to the error signal or difference voltage from the third circuit means 40 to produce periodic output pulses whose width varies with the output voltage of the generator 10 and a pulse amplifying circuit 200 for amplifying the periodic output pulses from the switching transistor T1 before the pulses are applied to the field winding 22 of the exciter 20. Broadly, the regulator system 30 operates to provide excitation current to the field winding 12 of the generator 10 through the exciter 20 in the form of periodic pulses whose width is varied in accordance with the output voltage of said generator in order to maintain the output voltage of the generator 10 at substantially a predetermined regulated value.

Energy for the regulator system 30 and the excitation current for the generator 10 are obtained from the line conductors 14, 16 and 18 which, in turn, are connected to the output terminals 15, 17 and 19, respectively, of the generator 10. In particular, the three-phase potential transformer 52 which is responsive to the output voltage of the generator 10 and the current transformers 54, 56 and 58 which are responsive to the output current of said generator are so interconnected as to produce a combined three-phase output voltage at the conductors 183, 185 and 187. In this instance, the transformer 50 includes the primary phase windings 72, 74 and 76 which are connected in a Y arrangement to the line conductors 18, 16 and 14, respectively. The current transformers 54, 56 and 58 are disposed adjacent to and in inductive relation with the line conductors 14, 16 and 18, respectively, and the output voltage from said current transformers varies with or is responsive to the output current from the generator 10 which flows in the respective line conductors. The transformer 52 also includes three secondary phase windings 82, 84 and 86, one end of each of said secondary phase windings being connected to the neutral terminal N2 through one of the associated current transformers 58, 56 and 54, respectively. The other ends of the secondary phase windings 82, 84 and 86 are connected to the combined three-phase output conductors 183, 185 and 187, respectively. The three-phase output voltage at the conductors 183, 185 and 187 is applied to the input terminals 15 of the three-phase full wave rectifier 62 to which said conductors are connected. The unidirectional or direct-current output voltage of the full wave rectifier 62 appears at the output terminals 101 and 103 of the full wave rectifier 62. The negative terminal 103 of the full wave rectifier 62 is connected to the conductor NL1 and the positive terminal 101 of the full wave rectifier 62 is connected to the conductor PL1. In order to provide a substantially constant direct-current voltage for reasons which will be discussed hereinafter, the resistor 134 and the semiconductor diode 154 are connected in series circuit relationship, the series circuit being connected between the conductors NL1 and PL1 across the output of the full wave rectifier 62. The semiconductor diode 154 is preferably of the type known to the art as a Zener diode. Since the voltage across the diode 154 is normally in excess of the breakdown voltage of the diode 154, the voltage at the common terminal 135 between said diode and the resistor 134 will be a substantially constant direct-current voltage which is positive with respect to the voltage at the conductor NL1. The voltage dropping resistor 134 also serves to limit the current which flows through the diode 154 after the diode 154 breaks down. It is to be noted that the positive terminal 101 of the full wave rectifier 62 is connected directly to one side of the field winding 22 of the exciter 20 by the conductor PL1.

The manner in which the potential transformer 52 and the current transformers 54, 56 and 58 are interconnected in circuit relation with the regulator system 30 and the output terminals of the generator 10 has several important results. For example, even if the line conductors 14, 16 and 18 or the load circuit connected thereto should become shorted or if a fault condition should occur thereon, thereby reducing the output voltage of the transformer 52 to a negligible value, the current transformers 54, 56 and 58 will continue to supply voltage to the regulator system 30 thereby providing field excitation for the generator 10 even when the line conductors 14, 16 and 18 are shorted. In other words, sufficient excitation is assured for the generator 10 during short circuit or fault conditions so that the output current of the generator 10 will be sufficient to actuate associated protective equipment, such as fuses or thermal type circuit breakers.

In order to obtain a unidirectional output voltage whose magnitude varies with the output voltage of the generator 10, the first circuit or rectifying means 90 is connected in circuit relation with the output terminals 15, 17 and 19 of said generator through the line conductors 14, 16 and 18, respectively. As illustrated, the first circuit means 90 includes the potential transformer 150 having three primary phase windings 172, 174 and 176 which are connected in a Y arrangement to the output terminals 19, 17 and 15, respectively, of the generator 10 through the line conductors 18, 16 and 14, respectively, with the neutral connection of said Y arrangement being connected to the neutral terminal N1 of the generator 10 and also to the common ground connection, as indicated at 32. The transformer 150 also includes three secondary phase windings 182, 184 and 186 which in this instance are connected in a delta arrangement. The three-phase alternating current output voltage of the transformer 150, which varies with the alternating current output voltage of the generator 10, is applied to the input terminals of a three-phase full wave rectifier 110, the delta connected secondary phase windings 182, 184 and 186 of the transformer 150 being connected to said input terminals. The unidirectional output voltage of the full wave rectifier 110 and of the first circuit means 90 appears at the output terminals 93 and 95 of the full wave rectifier 110 and includes a ripple component as indicated by the combined peaks of the waveforms A, B and C in FIG. 2, which may be regarded as the rectified phase voltages of the generator 10, which are normally present at the output terminals 15, 17 and 19 of the generator 10 and at the line conductors 14, 16 and 18, respectively. The unidirectional output voltage of the first circuit means 90 also includes a direct-current component in addition to the ripple component, as is well known in the art.

As mentioned previously, the second circuit or voltage shaping means 100 is provided in order to modify or convert the ripple component of the unidirectional output voltage from the first circuit means 90 to be substantially triangular in shape or configuration for reasons which will be discussed hereinafter. In particular, the second circuit means 100 includes the first and second capacitors 96 and 98 which are connected in series circuit relation with one another, the series circuit being connected across or in parallel with the output terminals 93 and 95 of the first circuit means 90. In order to ensure that the unidirectional output voltage from the first circuit means 90 of the terminals 93 and 95 is distributed in substantially a predetermined ratio across the first and second capacitors 96 and 98, respectively, the resistors 92 and 94 are connected in parallel circuit relation with the capacitors 96 and 98, respectively, the resistors 92 and 94 also being connected in series circuit relationship with one another across the output terminals 93 and 95 of the first circuit means 90, as shown in FIG. 1.

In operation, the second circuit means 100 modifies or converts the ripple component of the unidirectional output voltage of the first circuit means 90 to be substantially triangular in shape as indicated by the enlarged curves or waveforms 410, 430 and 440 in FIGS. 4, 5 and 6, respectively, for different operating conditions of the generator 10. The extent to which the shape of the harmonic component of the unidirectional output voltage of the first circuit means 90 is modified or converted by the operation of the capacitors 96 and 98 is determined by the time constant of the capacitors 96 and 98 in combination with the resistances of the resistors 92 and 94 and the effective resistance in parallel with said capacitors in the balance of the regulator system 30.

In general, the third circuit means for error detecting circuit 40 is connected in circuit relation with the first and second circuit means 90 and 100, respectively, in order to compare the unidirectional output voltage of the first circuit means 90, as modified by the operation of the second circuit means 100, with substantially a predetermined voltage or with a reference voltage in order to obtain a difference output voltage or error signal which is substantially triangular in shape. The output difference voltage or error signal from the third circuit means 40 may also include a direct-current component which is relatively small in magnitude as determined by the difference between the reference voltage or level of the third circuit means 40 and the direct-current component of the unidirectional output voltage from the first circuit means 90, as modified by the operation of the second circuit means 100.

In this instance, the third circuit means or error detecting circuit 40 comprises a well-known bridge circuit 50 and a rheostat 68. The input terminals 43 and 45 of the bridge circuit 50 are connected through the rheostat 68 across the output terminals 93 and 95 of the first circuit means 90 and also across the second circuit means 100, as previously described. The bridge circuit 50 includes two parallel branches, a first branch comprising the resistor 42 connected in series circuit relationship with the semiconductor diode 46 and a second branch comprising the semiconductor diode 48 and the resistor 44 connected in series circuit relationship. The semiconductor diodes 46 and 48 are preferably of the type known to the art as Zener diodes. The output difference voltage or error signal of the third circuit means or error detecting circuit 40 appears at the output terminals 47 and 49 of the bridge circuit 50.

In the operation of the third circuit means or error detecting circuit 40, the unidirectional output voltage of the first circuit means 90, as modified by the second circuit means 100, is a measure of the output terminal voltage of the generator 10. The rheostat 68 is provided in order to vary the portion of the unidirectional output voltage of the first circuit means 90, as modified by the operation of the second circuit means 100, that is applied to the input terminals of the bridge circuit 50. During normal operation, the unidirectional voltage applied across each of the semiconductor diodes 46 and 48 remains substantially constant since the voltage applied to each of the semiconductor diodes 46 and 48 is always of a greater magnitude than the breakdown voltage of the diodes 46 and 48. It will, therefore, be seen that when a unidirectional voltage is applied at the input terminals of the bridge circuit 50 which is equal to twice the voltage drop across each of the semiconductor diodes 46 and 48 there will be substantially no voltage difference existing across the output terminals 47 and 49 of the third circuit means 40. When, however, the voltage across the input terminals 43 and 45 of the bridge circuit 50 is either above or below the reference voltage of the bridge circuit 50 which is twice the voltage drop across each of the semiconductor diodes 46 and 48, then a voltage difference will exist across the output terminals 47 and 49 of the third circuit means 40. The polarity of the output difference voltage or error signal from the third circuit means 40 of the terminals 47 and 49 will depend upon whether the input voltage is above or below the reference voltage of the bridge circuit 50. In the normal range of operation of the regulator system 30 as illustrated, only one polarity of output voltage from the third circuit means 40 is normally applied to the switching transistor T1. In particular, the polarity of the output difference voltage or error signal from the third circuit means 40 which is substantially triangular in configuration is normally slightly positive at the terminal 49 with respect to the voltage at the output terminal 47 of the third circuit means 40. The rheostat 68 may be adjusted initially to obtain the desired magnitude and polarity of the output difference voltage from the third circuit means 40 and the setting of the rheostat 68 may also be changed to adjust the regulated value of voltage at which the regulator system maintains the output terminal voltage of the generator 10. In effect, the third circuit means 40 operates to subtract substantially a predetermined voltage or a reference voltage from the unidirectional output voltage of the first circuit means 90, as modified by the second circuit means 100, to obtain substantially a triangular output difference voltage or error signal from the third circuit means 40, which may additionally include a direct-current component and which varies with the output voltage of the generator 10 as reflected by the unidirectional output voltage of the first circuit means 90, as previously discussed. It has been found that the magnitude or amplitude of the substantially triangular component of the output voltage from the first circuit means 90, as modified by the operation of the second circuit means 100, and which is found at the output the third circuit means 40 varies only to a slight or negligible degree over the normal voltage operating range of the generator 10 while the direct-current component of the output difference voltage or error signal at the output terminals 47 and 49 of the third circuit means 40 varies to a much greater degree with the changes in the magnitude of the output terminal voltage of the generator 10 at the output terminals 15, 17 and 19.

In general, the switching means, more specifically the switching transistor T1, having a base, an emitter and a collector and which is of the npn junction type, is connected to be responsive to the output difference voltage or error signal from the third circuit means 40 at the terminals 47 and 49. In particular, the emitter of the switching transistor T1 is connected to the conductor NL1 through the resistor 158 while the collector of the transistor T1 is connected to the common terminal 135 between the diode 154 and the resistor 134 through the resistor 156, the voltage at the latter terminal being positive with respect to the voltage at the conductor NL1 and substantially consant, as previously explained. In order to apply the output difference voltage or error signal from the third circuit means 40 which is substantially triangular in shape between the base and the emitter of the transistor T1, the output terminal 49 of the third circuit means 40 is connected to the base of the transistor T1 through the current limiting resistor 66, while the output terminal 47 of the third circuit means 40 is connected to the emitter of the transistor T1 through the conductor NL1 and the resistor 158.

In order to provide a suitable time delay or series compensation network in the regulator system 30, the inductance 142 and the capacitors 148 and 152 are connected in series circuit relationship with one another, the series circuit being connected between the output terminal 47 of the third circuit means 40 and the base of the transistor T1. The semiconductor diodes 144 and 146 are connected in parallel circuit relationship with the capacitors 148 and 152, respectively, and in series circuit relation with one another and with the inductance 142 in order to protect the capacitors 148 and 152 when said capacitors are subjected to applied voltages greater than a predetermined value or to prevent the application of voltages to said capacitors of a predetermined polarity. The diodes 144 and 146 are preferably of the type known to the art as Zener diodes and are connected in back-to-back relationship or reversely poled with respect to one another as shown in FIG. 1. The capacitors 148 and 152 and the inductance 142 cooperate with the current limiting resistor 66 and the effective resistance of the components in the third circuit means 40 and the transformer 150 to form a series compensation network which stabilizes the operation of the regulator system 30, which of course is a closed loop system.

The transistor T1 operates in a switching mode such that when a voltage slightly in excess of the threshold voltage is applied between the base and the emitter of the transistor T1, the transistor T1 is effectively turned "on" and saturation current flows from the collector to the emitter of the transistor T1. The voltage $V_s$ necessary to cause saturation current to flow in the collector-emitter path of the transistor T1 is positive at the base with respect to the voltage at the emitter of the transistor T1. When the instantaneous output difference voltage or error signal from the third circuit means 40 is less than the threshold voltage of the transistor T1, the transistor T1 is substantially cutoff or nonconducting. The latter condition of the transistor T1 also prevails in the absence of an output difference voltage or error signal from the third circuit means 40. Saturation current will flow from the collector to the emitter of the transistor T1 when the instantaneous output difference voltage or error signal from the third circuit means 40 slightly exceeds the threshold voltage required between the base and the emitter of the transistor T1.

The switching transistor T1 cooperates with the first, second and third circuit means 90, 100 and 40, respectively, to form a pulse width modulator 190 whose operation is illustrated by the graphs A and B in FIG. 4. The substantially triangular output difference voltage or error signal from the third circuit means 40 when the output voltage of the generator 10 is substantially at the regulated value is represented by the curve 410. The voltage $V_S$ necessary to cause saturation current to flow from the collector to the emitter of the transistor T1 is represented by the line 420. Referring to graph A of FIG. 4, during the portion of the substantially triangular waveform 410 when the output difference voltage or error signal from the third circuit means 40 exceeds the threshold voltage $V_S$ represented by the line 420, as indicated at $T_R$, saturation current will flow from the collector to the emitter of the transistor T1 and the voltage at the collector of the transistor T1 will correspondingly drop to substantially a predetermined value for the same pulse time duration or width $T_R$, as indicated in graph B of FIG. 4. When the voltage between the base and the emitter of the transistor T1 decreases to a value below the threshold voltage $V_S$, the voltage at the collector of the switching transistor T1 will be restored to its normal high value as indicated by the curve 510 in graph B of FIG. 4. Since the saturation current which flows from the emitter to the collector of the transistor T1 will be substantially constant during the portion of time when the transistor T1 is conducting saturation current, the substantially triangular output difference voltage or error signal from the third circuit means 40 is converted by the operation of the transistor T1 to periodic output pulses, as indicated by the curve 510 in the graph B of FIG. 4, the width of said periodic output pulses varying with the direct-current component of the output difference voltage or error signal from the third circuit means 40, which in turn depends upon the magnitude of the output terminal voltage of the generator 10 as previously explained. The frequency of the output pulses from the transistor T1 will be the same as the frequency of the substantially triangular output difference voltage or error signal from the third circuit means 40 which is substantially six times the output frequency of the three-phase output voltage from the generator 10 during the normal operation of the generator 10.

Assuming that the output voltage of the generator 10 increases to a value above the regulated value, the output difference voltage or error signal from the third circuit means 40, which is substantially triangular in shape would include a larger direct-current component and the output difference voltage or error signal from the error detecting circuit or third circuit means 40, as indicated by the curve 430, will exceed the threshold voltage $V_S$ as indicated by the straight line curve 420 for a greater portion of each cycle of the output difference voltage from the third circuit means 40, as indicated by the time interval or pulse width $T_U$ in the graph A of FIG. 5. The width of the corresponding output pulses at the collector of the switching transistor T1 will increase to a corresponding degree, as indicated by the curve 530 in the graph B of FIG. 5. On the other hand, if the output voltage of the generator 10 decreases to a value below the regulated value, the output difference voltage or error signal from the third circuit means 40 which is substantially triangular in shape will include a smaller direct-current component and the switching transistor T1 will conduct saturation current for a smaller time interval or pulse width, as indicated at $T_D$ in the graphs A and B of FIG. 6 since the instantaneous output voltage difference or error signal from the third circuit means 40 exceeds the threshold voltage $V_S$ as indicated by the curve 420 for a shorter time interval during each cycle of the output difference voltage or error signal, as indicated by the curve 440 in the graph A of FIG. 6, from the third circuit means 40. The corresponding output pulses at the collector of the switching transistor T1 will, therefore, decrease correspondingly to have a width also indicated as $T_D$ in the graph B of FIG. 6.

In summary, the output of the pulse width modulator 190, which includes the first, second and third circuit means 90, 100 and 40, respectively, and the switching transistor T1 will be in the form of periodic output pulses, the width of which will vary in accordance with the output difference voltage or error signal from the error detecting circuit or third circuit means 40. The width of the pulses will be greater or less depending upon whether the output voltage of the generator 10 is below or above the regulated value of the output voltage of the generator 10. Periodic pulses of current will flow from the common terminal 135 between the diode 154 and the resistor 134 through the resistor 156 into the collector and out of the emitter of the transistor T1 and through the resistor 158 to the conductor NL1. The pulses of current which flow from the collector to the emitter of the transistor T1 will have substantially a constant magnitude but a varying time width which depends upon the magnitude of the direct-current component of the substantially triangular output difference voltage or error signal from the third circuit means 40, as previously explained.

In general, the pulse amplifying circuit 200 is connected in circuit relationship between the switching transistor T1 and the field winding 22 of the exciter 20 for amplifying the periodic output pulses provided by the pulse width modulator 190, which includes the first, second and third circuit means 90, 100 and 40, respectively, and the switching transistor T1. The pulse amplifying circuit 200 comprises a plurality of transistors T2, T3, T4, T5 and T6 each having a base, an emitter and a collector. As illustrated, the transistors T2 through T5 are connected to amplify the periodic output pulses from the pulse width modulator 190 just described before the pulses are applied to the transistor T6 which is connected as a control or switching element in series circuit relationship with the excitation field winding 22, the series circuit being connected through the diode 188 across the unidirectional current output voltage of the full wave rectifier 62. The transistors T2, T4, T5 and T6 are arranged to be conducting in the absence of periodic ouput pulses from the switching transistor T1 while the switching transistor T3 is arranged to be substantially nonconducting or cutoff in the absence of periodic output pulses from the switching transistor T1. The transistors T2 through T6 similarly to the switching transistor T1, are illustrated as being of the n-p-n junction type and are all operated in a switching mode so that each of said transistors is either conducting saturation current or substantially nonconducting or cutoff.

The periodic output pulses from the pulse width modulator 190 previously described at the collector of the transistor T1 are applied to the transistor T2 to cause a change in the voltage between the base and the emitter of the transistor T2. The emitter of the transistor T2 is connected to the conductor NL1 through the reactor 158 similarly to the transistor T1 while the base of the transistor T2 is connected to the common terminal between the collector of the transistor T1 and the resistor 156 which serves as a load resistor for the transistor T1. The resistor 158 also serves to sharpen the switching response or triggering of the transistors T1 and T2. The collector of the transistor T2 is connected through the resistor 132 to the common terminal 135 between the diode 154 and the resistor 134, the voltage at the latter terminal being positive with respect to the voltage at the conductor NL1 and substantially constant as previously explained. The resistor 132 also serves as a load resistor for the transistor T2 which is normally conducting saturation current in the absence of an output pulse from the first transistor T1, which would appear across the load resistor 156, since the voltage then applied between the base and the emitter of the transistor T2 would be in excess of the threshold voltage required to cause saturation current to flow in the transistor T2. When an output pulse appears at the collector of the transistor T1 and across the load resistor 156, the voltage between the base and the emitter of the transistor T2 decreases below the threshold voltage and the transistor T2 then becomes substantially nonconducting or cutoff for the duration of such a pulse.

The output of the transistor T2 which appears at its collector and across the load resistor 132 is applied to the switching transistor T3 through the diode 136 whenever an output pulse appears at the collector of the transistor T1. In particular, the emitter of the switching transistor T3 is directly connected to the conductor NL1 while the base of the transistor T3 is connected to the common terminal between the collector of the transistor T2 and the load resistor 132 through the diode 136, which serves to effectively increase the threshold voltage of the transistor T3 by substantially a predetermined value. The collector of the transistor T3 is connected to the conductor PL1 through the load resistor 138. As previously mentioned, the transistor T3 is normally arranged to be substantially nonconducting or cutoff in the absence of a periodic output pulse at the output of the transistor T1. Whenever an output pulse appears at the output of the transistor T1 across the load resistor 156, the switching transistor T2 then becomes substantially nonconducting or cutoff as previously explained and the voltage drop across the load resistor 132 associated with the transistor T2 decreases to cause a corresponding change in the voltage between the base and the emitter of the transistor T3. The latter change in the voltage between the base and the emitter of the transistor T3 is in a direction as to increase the voltage therebetween to a value of the proper polarity above the threshold voltage of the transistor T3, as modified by the diode 136, and the transistor T3 will conduct saturation current in the collector-emitter circuit for the duration of the applied pulse from the transistor T2. The output pulse which appears at the collector of the transistor T3 across its associated load resistor 138 is then applied to the switching transistors T4, T5, and T6 which, in general, are connected as directly coupled amplifiers to additionally amplify the periodic output pulses at the output of the transistor T1.

In particular, the base of the transistor T4 is connected to the common terminal between the collector of the transistor T3 and the load resistor 138 while the emitter of the transistor T4 is connected to the conductor NL1 through the resistor 164. The collector of the transistor T4 is connected to the conductor PL1 through the load resistor 162. The emitter of the transistor T4 is directly connected to the base of the transistor T5 so that the output current of the transistor T4 becomes the input current or signal of the transistor T5. Similarly, the emitter of the transistor T5 is directly connected to the base of the transistor T6 so that the output current or signal of the transistor T5 becomes the input signal or current for the transistor T6. The emitters of the transistors T5 and T6 are connected to the conductor NL1 through the resistor 168 and the diode 188 whose purposes will be explained hereinafter. The collectors of the transistors T5 and T6 are connected to each other and to the common ground connection, as indicated at 32, which is also connected to one end of the field winding 22 of the exciter 20 as previously mentioned. The resistors 164 and 168 are preferably of the type having a negative temperature coefficient in order to compensate for the changes in the threshold voltages of the transistors T5 and T6 with changes in environmental temperature. The resistor 178 is connected between the conductor PL1 and the common terminal between the emitter of the transistor T6 and the diode 188 to cooperate with the diode 188 in reducing the leakage current in the collector-emitter circuits of the transistors T5 and T6 whenever the latter transistors are substantially nonconducting or cutoff. The diode 166, which may be the type of well-known non-linear device which has a low forward resistance and a high backward or reverse resistance, is connected in parallel circuit relationship with the field winding 22 of the exciter 20 between the common ground connection 32 and the conductor PL1. The diode 166 is provided as a low resistance path for the voltage produced by the collapsing field of the excitation field winding 22 during periods in which the transistor T6 is nonconducting. The diode 166 prevents any excessive voltage across the transistors T2 through T6 due to the voltage produced by the collapsing field of the excitation field winding 22.

As mentioned previously, the transistors T4, T5, and T6 are arranged to conduct saturation current in the absence of periodic output pulses at the output of the transistor T1. When an output pulse appears at the output of the transistor T1 and the transistor T3 begins to conduct saturation current as previously explained, the voltage across the load 138 increases to thereby decrease the voltage between the base and the emitter of the transistor T4 to a value below the threshold voltage of the transistor T4 which then becomes substantially nonconducting or cutoff. Since the transistors T5 and T6 are directly coupled to the output of the transistor T4, the transistors T5 and T6 similarly become nonconducting or cutoff to thereby decrease the excitation current applied to the field winding 22 of the exciter 20 to a negligible value.

Referring to the graphs C and D of FIGS 4, 5 and 6, the operation of the pulse amplifying circuit 200 is illustrated for the operating conditions of the generator 10 when the output voltage of said generator is at the regulated value, above the regulated value, and below the regulated value, respectively. In particular, the curves 610, 630 and 640 indicate the output pulses at the output of the transistor T2 when periodic output pulses appear at the output of the transistor T1 and are amplified by the operation of the transistor T2. The curve 610 illustrates the pulse width which corresponds to an operating condition of the generator 10 when the output voltage is substantially at the regulated value while the curves 630 and 640 indicate the pulse width corresponding to the operating conditions of the generator 10 when the output voltage is above the regulated value and below the regulated value, respectively. The output voltage pulses which are applied to the field winding 22 of the exciter 20 because of the amplified pulses which appear at the output of the transistor T6 in the pulse amplifying circuit 200 are indicated by the curve 710 of the graph D of FIG. 4 when the output voltage of the generator is substantially at the regulated value, while the curves 730 and 740 of the graphs D of FIGS. 5 and 6, respectively, indicate the output voltage pulses applied to the field winding 22 when output voltage of the generator 10 is above the regulated value and below the regulated value, respectively.

In summary, the operation of the pulse amplifying circuit 200 is to amplify the periodic output pulses from the pulse width modulator 190 as previously described at the output of the transistor T1 and to control the conductivity or on-off time of the transistor T6 in accordance with the amplified pulses in order to vary the average excitation current applied to the excitation field winding 22 of the exciter 20. The width of the periodic output pulses from the pulse width modulator 190 determines the portion of time during which the transistor T6 is either conducting or nonconducting. The portion of time during which the transistor T6 is conducting compared to the portion of the time during which the transistor T6 is substantially nonconducting or cutoff determines the average value of the excitation current applied to the excitation field winding 22 of the exciter 20. The average value of the current applied to the excitation field winding 22 of the exciter 20 determines the output voltage across the armature 24 of the exciter 20. The output voltage across the armature 24 of the exciter 20 determines the excitation current applied to the excitation field winding 12 of the generator 10. The output terminal voltage of the generator 10 is controlled, in turn, by the excitation current applied to the excitation field winding 12 of the generator 10. As previously explained, the excitation current applied to the field winding 22 of the exciter 20 through the collector-emitter path of the transistor T6 is supplied from the output of the full wave rectifier 62 whose input is supplied from the output of the generator 10 through the transformer 50 and the current transformers 54, 56 and 58. It is important to note that the full wave rectifier 62 supplies excitation current to the field winding 22 of the exciter 20 in the absence of periodic output pulses from the transistor T1 which, in turn, depends upon the necessary output difference voltage or error signal from the third circuit means 40 which, in turn, depends upon the output terminal voltage of the generator 10. It will be seen, therefore, that the latter feature will be particularly advantageous during the starting up of the generator 10, since the regulator system 30 is arranged to supply excitation current to the field winding 22 of the exciter 20 even though the voltage of the generator 10 is not of the normal magnitude, such as to cause a normal difference voltage or error signal to be applied to the transistor T1 and the pulse amplifying circuit 200 from the third circuit means 40. It is also important to note that the excitation current which is supplied from the line conductors 14, 16 and 18 through the full wave rectifier 62 to the field winding 22 flows from the positive terminal 101 through the conductor PL1 to the common ground connection 32 and then through the collector-emitter path of the transistor T6 which functions as a switching means or device as previously described and then through the diode 188 to the conductor NL1 and back to the negative terminal 103 of the full wave rectifier 62.

The operation of the complete regulator system 30 shown in FIG. 1 will now be described. The rheostat 68 of the third circuit means 40 is adjusted initially so that an output difference voltage or error signal appears at the output terminals 47 and 49 of the third circuit means 40 which is slightly positive at the terminal 49 with respect to the voltage at the terminal 47 during normal operating conditions of the generator 10. The magnitude of the output difference voltage or error signal from the third circuit means 40 is also adjusted to be of the proper value to cause periodic output pulses, as shown in graph B of FIG. 4, to appear at the output of the pulse width modulator 190 as previously described at the collector of the transistor T1 which, when amplified by the pulse amplifying circuit 200 and applied to the transistor T6, will cause a value of average excitation current to be applied to the excitation field winding 22 of the exciter 20 which will result in a desired value of regulated voltage at the output terminals 15, 17 and 19 of the generator 10. After the rheostat 68 has been adjusted for the desired regulated value of voltage at the output terminals of the generator 10, any change in the output terminal voltage of the generator 10 will result in a change in the output voltage of the third circuit means 40 which appears at the terminals 47 and 49. For example, if the output terminal voltage of the generator 10 should start to drop below the regulated value, the direct-current component of the output difference voltage or error signal from the third circuit means 40 appearing at the terminals 47 and 49 will decrease as the output terminal voltage of the generator 10 decreases. The effect of a decrease in the direct-current component of the output difference voltage or error signal at the output terminals 47 and 49 of the third circuit means 40 is illustrated by the curve 540 in the graph B of FIG. 6. As the output terminal voltage of the synchronous generator or alternator 10 decreases and the direct-current component of the output difference voltage or error signal from the third circuit means 40 decreases, the width of the periodic output pulses from the pulse width modulator 190 also decrease, as indicated by the pulse time duration $T_D$ in FIG. 6. The periodic output pulses of decreased width from the pulse width modulator are then amplified by the pulse amplifying circuit 200 and applied to the transistor T6 with the effect that the portion of time during which the transistor T6 conducts increases and the average current applied to the excitation field winding 22 of the exciter 20 also increases. The output voltage of the exciter 20 across the armature 24 also increases and the excitation current applied to the excitation field winding 12 of the generator 10 increases until the output terminal voltage of the generator 10 increases to its regulated value.

On the other hand, if the output terminal voltage of the generator 10 increases to a value above the desired regulated value, then the direct-current component of the output difference voltage or error signal from the third circuit means 40 increases and the width of the periodic output pulses from the pulse width modulator also increases as illustrated by the waveform 530 in the graph B of FIG. 5 and as indicated by the pulse time duration $T_U$ in FIG. 5. When the width of the periodic output pulses from the pulse width modulator increases, the output pulses applied to the transistor T6 of the pulse amplifying circuit 200 reduces the relative portion of time during which the transistor T6 is conducting and, therefore, reduces the average current applied to the excitation field winding 22 of the exciter 20. The output voltage of the exciter 20 and the excitation current applied to the excitation field winding 12 of the generator 10 also decreases until the output terminal voltage of the generator 10 is reduced to substantially its regulated value.

The manner in which the second circuit means 100 modifies or converts the ripple component of the unidirectional output voltage from the first circuit means 90 to be substantially triangular in shape has the important advantage that it renders the regulator system 30 responsive to the highest phase voltage at the output terminals 15, 17 and 19 of the generator 10. The latter operating feature, therefore, prevents damage to whatever load is connected to the line conductors 14, 16 and 18 from the overvoltages which would otherwise occur when a fault is present on one of the phases of the electrical system connected to the line conductors 14, 16 and 18 and if the regulator system 30 were responsive to the average value of the three phase voltages at the line conductors 14, 16 and 18.

In particular, the effect of the operation of the capacitors 96 and 98 of the second circuit means 100 during normal operating conditions in modifying the shape of the ripple component of unidirectional output voltage from the first circuit means 90 to be substantially triangular, is indicated by the portions of the modified ripple component indicated at 260 in FIG. 3. Assuming, however, that a fault condition occurs on the phase indicated at C in FIG. 3 in one of the phases of the output voltage of the generator 10 at the line conductors 14, 16 and 18, and the voltage of the latter phase decreases to a relatively low magnitude, as indicated at C1 in FIG. 3, then the effect of the second circuit means 100 and, more particularly, the capacitors 96 and 98, in maintaining the magnitude of the voltage applied at the input terminals 43 and 45 of the bridge circuit 50 in the third circuit means 40 is indicated by the portions of the curve 270 in FIG. 3. In other words, the regulator system 30 will then respond to the higher of the two phase voltages A and B even though one or both of the latter phase voltages my increase to an abnormally large value when a fault occurs on the phase indicated by the phase voltage C and the regulator system 30 will continue to produce periodic output pulses of excitation current which are of a lower frequency and prevent abnormally high phase voltages at the output terminals 15, 17 and 19 of the generator 10. Similarly, even if a fault condition should affect both the phase voltages B and C as indicated by the reduced phase voltages B1 and C1 in FIG. 3, the effect of the second circuit means 100, as indicated by the portions of the curve 280 in FIG. 3, will be to maintain the input voltage applied to the third circuit means 40 at a relatively high magnitude and the operation of the regulator system 30 will respond to the highest phase voltage A which will often increase to an abnormally high value when a fault of the latter type occurs.

In summary, the operation of the regulator system 30 during the abnormal operating conditions or fault conditions just described will be to respond to the highest phase voltage at the output terminals of the generator 10 rather than to the average value of the three-phase voltages at the output terminals 15, 17 and 19 of the generator 10 as do many types of conventional regulator systems and prevent overvoltages in particular phase of the associated electrical system.

It is to be understood that an alternating current control voltage or signal other than the output voltage of the generator 10 may be applied to the pulse width modulator 190 as disclosed in order to vary the width of the periodic output pulses from said pulse width modulator and the average excitation current applied to the field winding 22 of the exciter 20 in order to control the excitation current applied to the field winding 12 of the generator 10 and the output voltage of said generator. It is also to be understood that the source of energy or direct-current for the regulator system 30 may also be a separate source of direct-current or a separate source of rectified alternating current. In certain applications, the capacitors 96 and 98 of the second circuit means 100 may be replaced by an inductive reactance connected in series circuit relation between the first circuit means 90 and the third circuit means 40. An electrical control apparatus embodying the teachings of this invention may also be employed to control the excitation of a dynamoelectric machine, such as the alternator or generator 10, that does not have a rotating exciter. In the latter case, the series compensation network included in the regulator system 30 may be unnecessary because of the absence of the time delay introduced into the regulator system by the exciter 20. It is obvious that the pulse amplifying circuit 200 could comprise more or less than five transistors or switching devices as determined by the current and voltage requirements at the output of the pulse amplifying circuit 200. Finally, it is to be understood that an electrical control apparatus as disclosed may be employed to provide periodic output pulses whose width varies with the magnitude of any alternating current control signal, such as the alternating current output voltage of a synchronous generator or alternator.

The apparatus and circuits embodying the teachings of this invention have several advantages. For example, operating the switching transistors in a switching mode as pulse amplifiers allows the control of an amount of power which is many times the power ratings of transistors operating as class A amplifiers. In addition, adjusting the excitation of the generator 10 by pulse width modulation substantially eliminates the problem of drift of the operating point and other problems associated with the direct-current amplifiers. An electrical control apparatus, such as a regulator system, embodying the teachings of this invention also has the advantage that the starting up of the alternator or synchronous generator associated therewith may be accomplished automatically without the need for a separate starting control signal since the regulator system 30 is arranged to produce excitation current even without the application of input control signals of a predetermined magnitude from the associated geneartor. Finally, an important advantage of the electrical control apparatus as disclosed is that pulse width modulation is provided without requiring a separate sawtooth voltage generator or relaxation oscillator as disclosed in U.S. Patent 2,896,149, previously mentioned.

Since numerous changes may be made in the above-described apparatus and circuits, and different embodiments of the invention may be made without departing from the spirit and scope thereof, it is intended that all the matter contained in the foregoing descripiton or shown in the accompanying drawing shall be interpreted as illustrative and not in a limiting sense.

I claim as my invention:

1. In electrical control apparatus for producing periodic output pulses whose width varies with an electrical quantity associated with an alternating current circuit, the combination comprising, first means connected in circuit relation with said alternating current circuit for producing a unidirectional output voltage having a ripple component, the magnitude of said output voltage varying with said electrical quantity, second means connected in circuit relation with said first means for modifying said ripple component of said unidirectional voltage, third means connected in circuit relation with said second means for obtaining the difference between said modified unidirectional voltage and a reference voltage, the difference voltage having a direct-current component whose magnitude varies with said electrical quantity, switching means connected in circuit relation with said third means, time delay means connected in circuit relationship between said third means and said switching means, said switching means being responsive to said difference voltage for producing periodic output pulses whose width varies with said electrical quantity.

2. In electrical control apparatus for producing periodic output pulses whose width varies with an electrical quantity associated with an alternating current circuit, the combination comprising, first means connected in circuit relation with said alternating current circuit for producing a unidirectional output voltage having a ripple component, the magnitude of said output voltage varying with said electrical quantity, second means connected in circuit relation with said first means for modifying said ripple component of said unidirectional voltage, third means connected in circuit relation with said second means for obtaining the difference between said modified unidirectional voltage and a reference voltage, the difference voltage having a direct-current component whose magnitude varies with said electrical quantity, semiconductor switching means connected in circuit relation with said third means, time delay means connected in circuit relationship between said third means and said switching means, said switching means being responsive to said difference voltage for producing periodic output pulses whose width varies with said electrical quantity.

3. In a regulator system for maintaining the output voltage of an alternator having an excitation field winding and output terminals at substantially a predetermined value, the combination comprising, first means connected in circuit relation with the ouput terminals of said alternator for obtaining a unidirectional voltage which includes a ripple component and which varies with said output voltage, second means connected in circuit relation with said first means for modifying the ripple component of said unidirectional voltage, third means connected in circuit relation with said second means for comparing the modified unidirectional voltage with substantially a predetermined voltage to obtain a difference voltage having a direct-current component, switching means connected in circuit relation with said third means, time delay means connected in circuit relationship between said third means and said switching means, said switching means being responsive to said difference voltage for producing periodic output pulses having a width which varies with said output voltage and fourth means connected between said switching means and said field winding for applying said pulses to said field winding as excitation current.

4. In a regulator system for maintaining the output voltage of an alternator having an excitation field winding and output terminals at substantially a predetermined value, the combination comprising, first means connected in circuit relation with the output terminals of said alternator for obtaining a unidirectional voltage which includes a ripple component and which varies with said output voltage, second means connected in circuit relation with said first means for converting the ripple component of said unidirectional voltage to substantially a triangular waveform, third means connected in circuit relation with said second means for comparing the converted unidirectional voltage to obtain a difference voltage having substantially a triangular waveform component and a direct-current component, fourth means connected in circuit relation with the output terminals of said alternator for supplying excitation current to said field windings, a plurality of switching amplifiers connected in circuit relation between said third means and said fourth means, time delay means connected in circuit relation between said third means and said switching amplifiers, said switching amplifiers being responsive to said difference voltage for producing periodic pulses having a width which varies with said output voltage to control the average excitation current supplied to said field winding by said fourth means, and circuit means connected in circuit relation with the last switching amplifier of said plurality for maintaining the latter amplifier in a conducting condition in the absence of output pulses from the balance of said switching amplifiers to thereby provide initial excitation current to the field winding of said alternator.

5. In a regulator system for maintaining the output voltage of an alternator having an excitation field winding and output terminals at substantially a predetermined value, the combination comprising, first means connected in circuit relation with the output terminals of said alternator for obtaining a unidirectional voltage which includes a ripple component and which varies with said output voltage, second means connected in circuit relation with said first means for converting the ripple component of said unidirectional voltage to substantially a triangular waveform, third means connected in circuit relation with said second means for comparing the converted unidirectional voltage to obtain a difference voltage having substantially a triangular waveform component and a direct-current component, fourth means connected in circuit relation with the output terminals of said alternator for supplying excitation current to said field windings, a plurality of switching transistors connected in circuit relation between said third means and said fourth means, time delay means connected in circuit relation between said third means and said switching transistors, said switching transistors being responsive to said difference voltage for producing periodic pulses having a width which varies with said output voltage to control the average excitation current supplied to said field winding by said fourth means and circuit means connected in circuit relation with the last switching transistor of said plurality for maintaining the latter transistor in a conducting condition in the absence of output pulses from the balance of said switching transistors to thereby provide initial excitation current to the field winding of said alternator.

References Cited in the file of this patent
UNITED STATES PATENTS

| | | |
|---|---|---|
| 2,740,086 | Evans et al. | Mar. 27, 1956 |
| 2,867,763 | Sichling | Jan. 6, 1959 |
| 2,896,149 | Lowry et al. | July 21, 1959 |

OTHER REFERENCES

Rona: Elektrotechnische Zeitschrift, vol. 80, No. 16, pp. 541 and 542, August 11, 1959.